United States Patent
Lin et al.

(10) Patent No.: US 7,171,162 B2
(45) Date of Patent: Jan. 30, 2007

(54) METHOD AND APPARATUS FOR FREQUENCY ESTIMATION USING ITERATIVE FILTERING IN A GSM COMMUNICATIONS SYSTEM

(75) Inventors: Jingdong Lin, Irvine, CA (US); Jiayi Zhuang, Shanghai (CN); Yueheng Sun, San Jose, CA (US); Fei Xie, Fremont, CA (US)

(73) Assignee: Spreadtrum Communications Corporation, Sunnyvale, CA (US)

( * ) Notice: Subject to any disclaimer, the term of this patent is extended or adjusted under 35 U.S.C. 154(b) by 661 days.

(21) Appl. No.: 10/721,060

(22) Filed: Nov. 24, 2003

(65) Prior Publication Data

US 2005/0113033 A1    May 26, 2005

(51) Int. Cl.
*H04B 17/00* (2006.01)

(52) U.S. Cl. .................. 455/67.11; 455/423; 455/306; 455/307; 375/240.21

(58) Field of Classification Search ............. 455/67.11, 455/423, 306, 307; 375/240.21
See application file for complete search history.

(56) References Cited

U.S. PATENT DOCUMENTS

| | | | | |
|---|---|---|---|---|
| 5,537,419 A | * | 7/1996 | Parr et al. ................... | 370/350 |
| 5,761,250 A | | 6/1998 | Lin | |
| 5,862,192 A | * | 1/1999 | Huszar et al. .............. | 375/347 |
| 6,418,175 B1 | * | 7/2002 | Pukkila et al. ............. | 375/347 |
| 2003/0081695 A1 | * | 5/2003 | Eilts et al. .................. | 375/316 |

* cited by examiner

*Primary Examiner*—Matthew Anderson
*Assistant Examiner*—Minh Dao
(74) *Attorney, Agent, or Firm*—Perkins Coie LLP

(57) ABSTRACT

A method of frequency estimation for a GSM communications system is disclosed. First, the a frequency control channel data burst is received and downsampled into a plurality of subsets. Then, the subsets are filtered using an auto-regressive filter. The filtered subsets are then correlated and summed to determine a parameter r. The estimated frequency is calculated based upon the parameter r.

16 Claims, 4 Drawing Sheets

METHOD AND APPARATUS FOR FREQUENCY ESTIMATION USING ITERATIVE FILTERING IN A GSM COMMUNICATIONS SYSTEM

TECHNICAL FIELD

The present invention relates to frequency estimation at a mobile station in a GSM transmission, and more particularly, using multiple sampled subsets of the frequency control channel tone in order to estimate frequency.

BACKGROUND

The most common standard for mobile communications in the world is the Global System for Mobile telecommunications (GSM). In one specific implementation, GSM utilizes two bands of 25 MHz, which have been set aside for system use. The 890–915 MHz band is used for subscriber to base station transmissions (reverse link), and the 935–960 MHz band is used for base station to subscriber transmissions (forward link). The GSM protocol uses frequency division duplexing and time division multiple access (TDMA) techniques to provide base stations with simultaneous access to multiple users. Transmissions on both the forward and reverse link are made at a channel data rate of 270.833333 Kbps, using binary Gaussian minimum shift key (GMSK) modulation.

In the GSM protocol, there are traffic channels and control channels. The traffic channels carry the digitized voice or user data. One of the control channels is what is known as the frequency correction channel (FCCH), which is a special data burst which occupies time slot 0 for the very first GSM frame and is repeated every ten frames within a control channel multiframe. The FCCH burst allows each mobile station to synchronize its internal frequency standard (local oscillator) to the exact frequency of the base station.

The data burst carried by the FCCH is nominally at a frequency one-quarter of the channel data rate, i.e., 270.833333÷4 or 67.708 KHz. Thus, the frequency correction channel is a single tone at the nominal frequency of 67.708 KHz. However, because of various factors, such as co-channel interference, fading, and Gaussian noise, the frequency of the received FCCH tone may vary from the nominal 67.708 KHz. In order for the mobile station to operate optimally, it is important to precisely determine the frequency of the FCCH tone to within 100 Hz.

One prior art method of estimating the frequency of the FCCH tone is disclosed in my U.S. Pat. No. 5,761,250 entitled "Iterative Filtering Frequency Estimator and Estimation Method". In this method, the FCCH burst is iteratively filtered to determine a pole estimate. Using the pole estimate, the frequency of the FCCH burst can be estimated. Still, the accuracy of the frequency estimation using this technique may not be sufficient.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

In the detailed description provided below, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
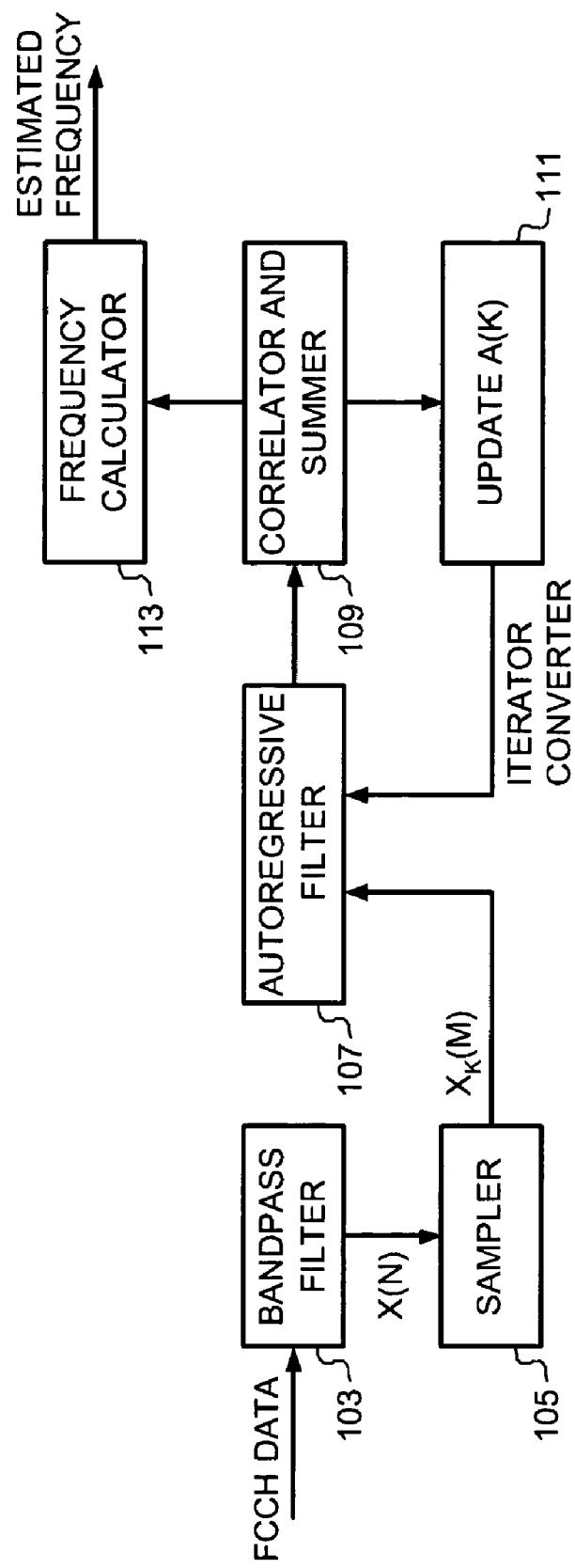
FIG. 1 is a schematic diagram of an apparatus for frequency estimation formed in accordance with the present invention.

Turning first to FIG. 1, the apparatus of the present invention is shown. The frequency estimator 101 comprises an optional bandpass filter 103, a sampler 105, an auto-regressive filter 107, a correlator and summer 109, an update calculator 111, and a frequency calculator 113. As will be set forth in greater detail below, the data from the frequency control channel (FCCH) may be optionally bandpass filtered by the bandpass filter 103.

The signal x(n) is then provided to a sampler 105 that will form a plurality of subsets based upon the signal x(n). The subsets are denoted as $x_k(m)$, where k is the index of the subset. Next, the auto-regressive filter 107 filters each of the sampled subsets. The output of the auto-regressive filter 107 is then provided to the correlator and summer 109 which performs the correlation and summing operation.

The update calculator 111 then updates the pole position of the auto-regressive filter. The auto-regressive filter 107, the correlator and summer 109, and the update calculator 111 operate iteratively for a predetermined amount of iterations until the pole position converges. Finally, a frequency calculator 113 calculates the estimated frequency using the output of the correlator and summer 109.

The components shown and described in FIG. 1 may be discrete processor components. However, more likely, the components are more typically implemented as one or more digital signal processors that are programmed to perform the indicated function.

Figure 2:
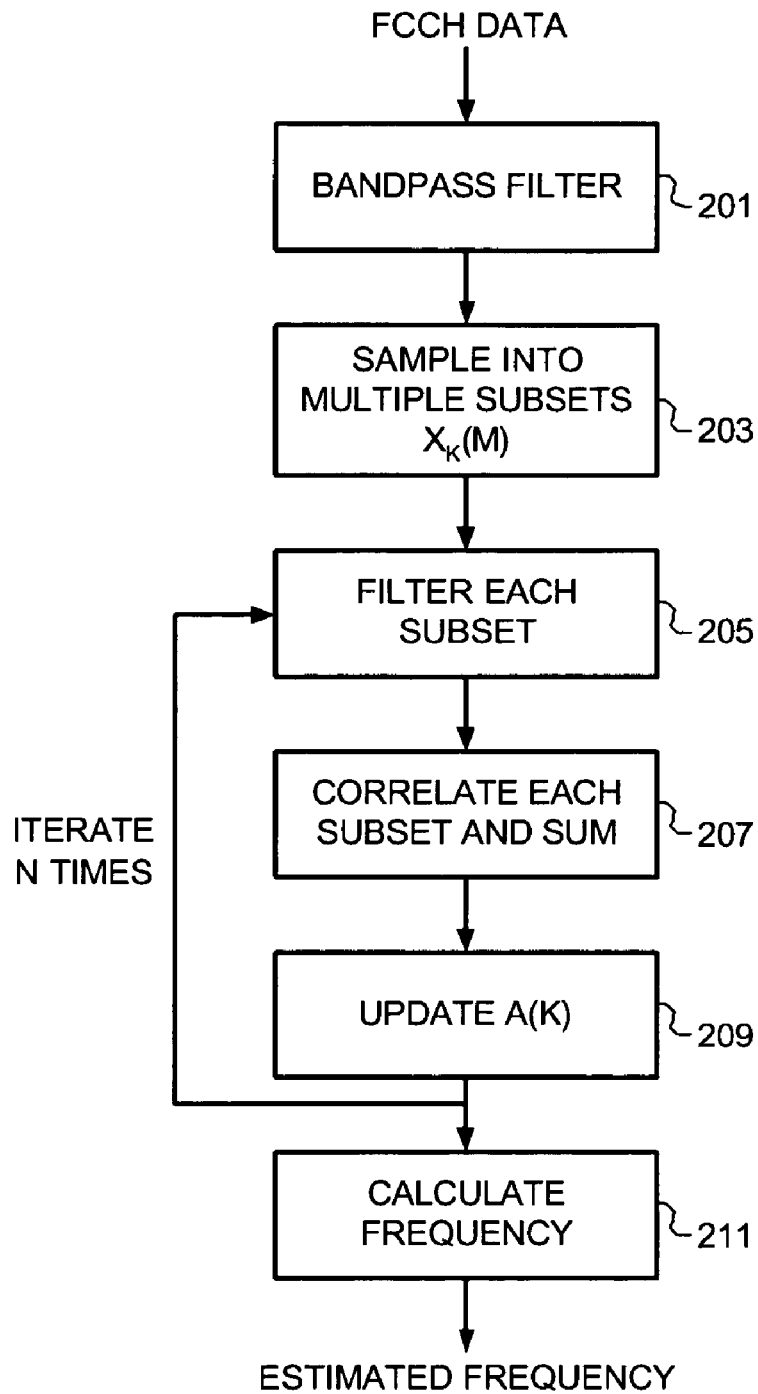
FIG. 2 is a flow diagram illustrating the method of the present invention.

Next, turning to FIG. 2, the present invention will first be described in general terms and then the mathematical basis for the present invention will be described after. First, at box 201, the received frequency control channel data may be optionally filtered to remove out of band noise and interference.

Then, at box 203, the signal x(n) is then sampled into multiple subsets $x_k(m)$. The number of subsets is designated as p. Each subset $x_k(m)$ contains a series of data samples that are taken every $p^{th}$ element in the sequence x(n), starting at index k. Thus, for p=4, the subset $x_1(m)$ consists of element numbers 1, 5, 9, 13, etc . . . of x(n). Further, for p=4, the subset $x_2(m)$ consists of element numbers 2, 6, 10, 14, etc ... of $x(n)$. The subset $x_3(m)$ consists of element numbers 3, 7, 11, 15, etc ... of $x(n)$. The subset $x_2(m)$ consists of element numbers 4, 8, 12, 16, etc ... of $x(n)$. In one embodiment, p=4 and there are four subsets calculated. In an alternative embodiment, p=8 and there are eight subsets calculated.

Next, at box 205, each of the subsets are filtered using an auto-regressive one pole filter. The pole position of the filter is designated as $a(k)$. After filtering, each of the subsets are then correlated and summed at box 207. As further seen below, this results in the calculation of the parameter r. Then, the pole position $a(k)$ is calculated based upon the arc tangent of the parameter r at box 209.

The process of boxes 205–209 is then repeated in an iterative fashion N amount of times. Each iteration refines the calculation of the auto-regressive filter parameter $a(k)$. Finally, at box 211, the carrier frequency is estimated based upon the latest version of the parameter r. With the method of the present invention described in general terms, next presented is the mathematical specifics with respect to a methodology of the present invention.

Figure 3:
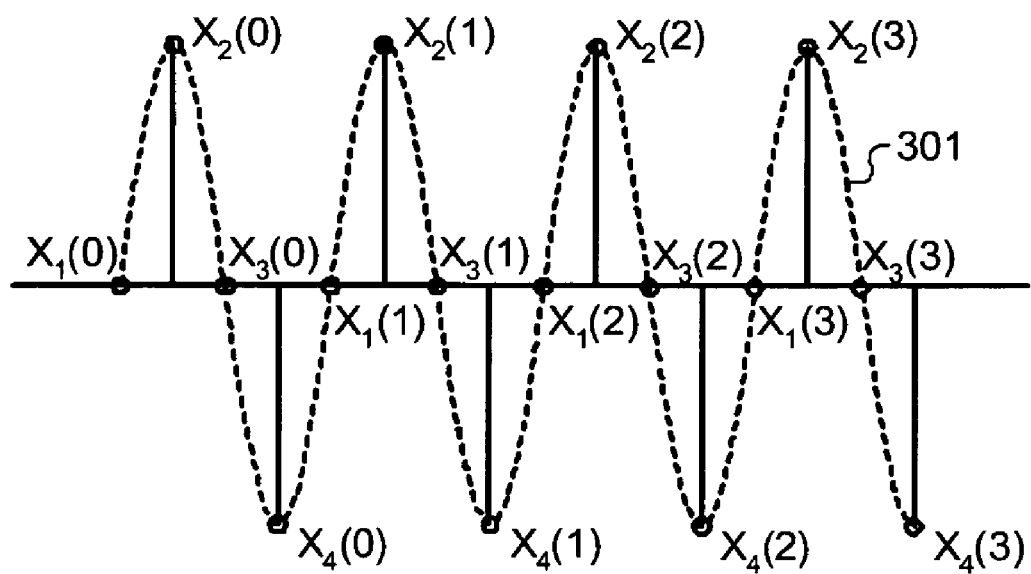
FIG. 3 shows a FCCH tone being sampled at the channel data rate in accordance with the present invention.

As noted above, the present invention uses an iterative filtering method after the received FCCH signal is first down-sampled into multiple subsets. The FCCH signal is a single tone with a frequency unknown to the mobile station (the subscriber) and includes 156 samples. As seen in FIG. 3, the received FCCH burst can be represented as a sinusoidal wave 301. The sinusoidal wave 301 is then sampled at the channel data rate of 270.8333 KHz, i.e., four times the nominal frequency of the FCCH burst. In one embodiment, every fourth or eighth sample is then grouped as an element in a subset. Thus, there are four or eight subsets, with each subset containing every fourth or eighth sample.

Figure 4:
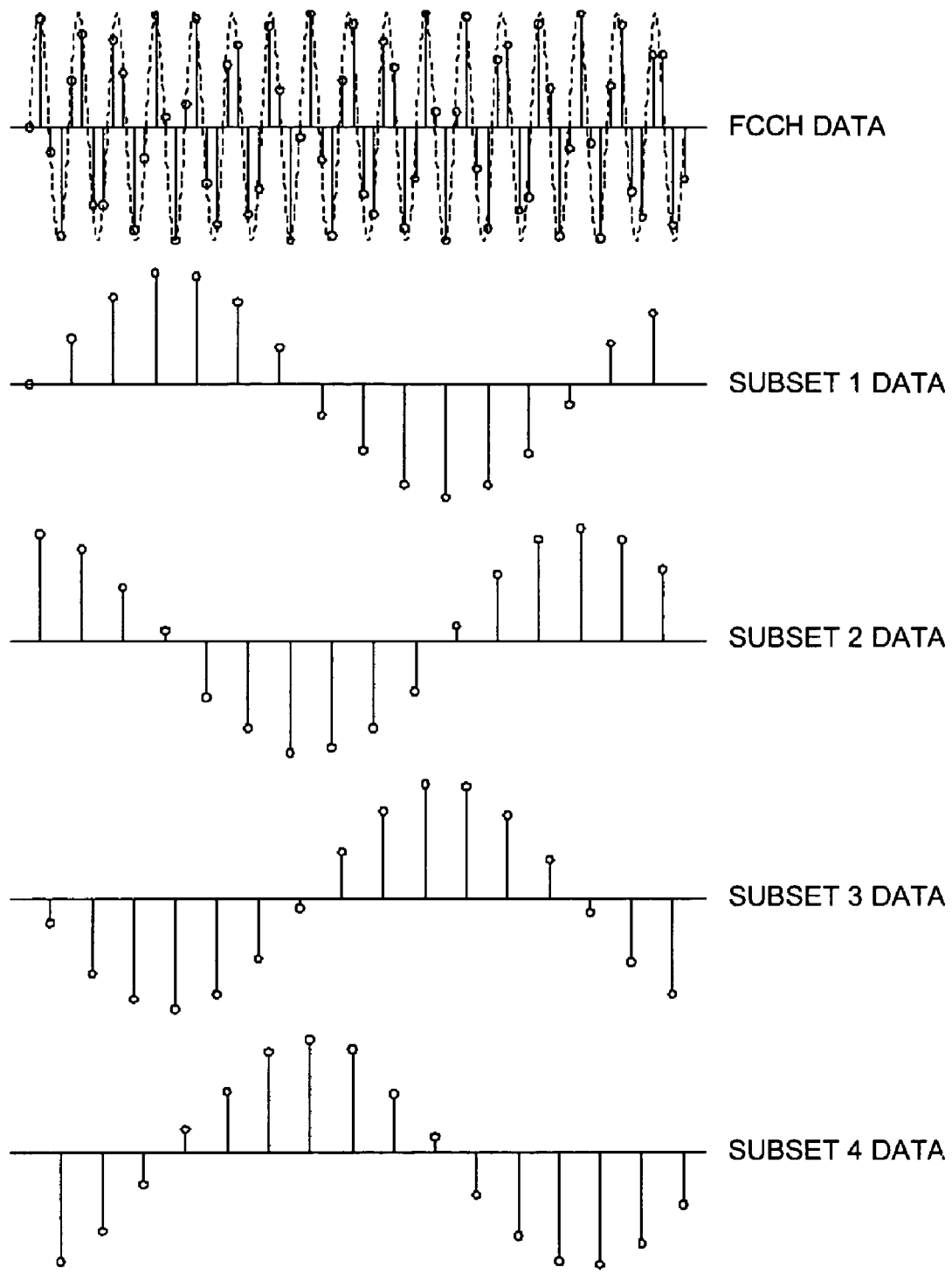
FIG. 4 shows a FCCH tone that has a frequency offset that results in the sampled subsets having a sinusoidal wave.

As a specific example, assume the received FCCH signal is represented as $x(n)$. Optionally, $x(n)$ has been bandpass filtered to eliminate out of band noise and interference. Then, $x(n)$ is sampled to form multiple subsets having a nominal frequency of 67.708 KHz. If $x(n)$ is at symbol rate of 270.83333 KHz, there will be 4 subsets. If $x(n)$ is double sampled, there will be 8 subsets. As used herein, the term sampling also means to divide the data sequence $x(n)$ into subsets that contain the data points at equidistant phase (time) relationship. This is seen graphically in FIG. 3. Note that FIG. 3 shows the situation where the FCCH tone is at the nominal frequency of 67.708 KHz. FIG. 4 shows the situation where the FCCH tone has a frequency offset from 67.708 KHz. The multiple subsets can be represented mathematically as:

$$x_k(m) = x(p \cdot m + k)$$

where p=4 and k=1, 2, 3 or 4 at the normal symbol rate; alternatively, p=8, and k=1, 2, ..., 8 for a double sampling rate. As seen in FIGS. 3 and 4, which shows a sampling rate of p=4, there are four subsets.

Next, each subset is filtered by a one-pole auto-regressive filter with parameter "$a(k)$," which is an auto-regressive parameter. In other words, the filter has a pole at $a(k)$.

This is represented mathematically as:

$$y_k(n) = x_k(n) + a(k) \cdot y_k(n-1)$$

where n=0, 1, 2, ..., 155 (for a total of 156 FCCH data samples) and $a(k)$ is the auto-regressive parameter of the k-th iteration. Note also that higher order filters may also be used, such as a two or three pole filter.

Next, the filtered output of each subset is correlated and all of the outputs all added together. In other embodiments, less than all of the subsets are filtered. This is represented mathematically as:

$$r = \sum_k \sum_q y_k(q+m) \cdot y_k^*(q)$$

where q is the sequence number for the subset. For p=4, each subset $x_k(m)$ includes 39 elements (156 data samples form the FCCH divided by 4). Therefore, q ranges from 1–39.

The parameter $a(k)$ is then updated as follows:

$$a(k) = \beta e^{j \cdot \frac{\angle r}{m}}$$

where $\beta$ is a number very close to unity (1) and $\angle r$ is the angle of r. In other words:

$$\angle r = a\tan\left(\frac{\text{Imag}(r)}{\text{real}(r)}\right)$$

This iterative process is repeated N times. It has been found that with N=8, this supplies adequate frequency estimation.

The estimated base station carrier frequency is then estimated as:

$$f = \frac{f_s}{2\pi} \cdot \frac{\angle r}{m}$$

where $f_s$ is the sampling frequency, i.e., the data frequency of $x(n)$. The parameter m is the interval in the correlation.

Using the present invention, it is easier to determine the phase from the signal. The present invention estimates the frequency error directly instead of indirectly.

While the preferred embodiment of the invention has been illustrated and described, it will be appreciated that various changes can be made therein without departing from the spirit and scope of the invention.

We claim:

1. A method of frequency estimation for a GSM communications system comprising:
   (a) receiving a frequency control channel data burst;
   (b) sampling said data burst into a plurality of subsets;
   (c) filtering at least one of said plurality of subsets to generate a filtered subset;
   (d) correlating each filtered subset and summing the result into a parameter r;
   (e) updating a filter parameter of said filter using the parameter r;
   (f) repeating steps (c)–(e) N iterations; and
   (g) calculating an estimated frequency based upon the parameter r.

2. The method of claim 1 wherein said filtering is performed on each of said plurality of subsets.

3. The method of claim 2 wherein said filtering is by use of an auto-regressive filter.

4. The method of claim 1 wherein said filtering is by use of an auto-regressive filter.

5. The method of claim 4 wherein said auto-regressive filter is a one-pole filter.

6. The method of claim 1 wherein said estimated frequency is calculated by:

$$f = \frac{f_s}{2\pi} \cdot \frac{\angle r}{m}$$

where f is the estimated frequency, $f_s$ is data frequency of said frequency control channel data burst, and m is an interval of correlation.

7. The method of claim 1, wherein said filter parameter is determined by:

$$a(k) = \beta e^{j \cdot \frac{\angle r}{m}}$$

where β is a forgetting factor and m is an interval of correlation.

8. The method of claim 1 wherein said parameter r is determined by:

$$r = \sum_k \sum_q y_k(q+m) \cdot y_k^*(q)$$

where q is the number of elements in said sampled subsets and m is an interval of correlation.

9. The apparatus of claim 1 wherein said means for calculating an estimated frequency operates by:

$$f = \frac{f_s}{2\pi} \cdot \frac{\angle r}{m}$$

where f is the estimated frequency, $f_s$ is data frequency of said frequency control channel data burst, and m is an interval of correlation.

10. The apparatus of claim 1 wherein said parameter r is determined by:

$$r = \sum_k \sum_q y_k(q+m) \cdot y_k^*(q)$$

where q is the number of elements in said sampled subsets and m is an interval of correlation.

11. An apparatus for frequency estimation in a GSM communications system comprising:
  (a) means for receiving a frequency control channel data burst;
  (b) means for sampling said data burst into a plurality of subsets;
  (c) means for filtering at least one of said plurality of subsets to generate a filtered subset;
  (d) means for correlating each filtered subset and summing the result into a parameter r;
  (e) means for updating a filter parameter of said filter using the parameter r;
  (g) means for calculating an estimated frequency based upon the parameter r.

12. The apparatus of claim 11 wherein said means for filtering is performed on each of said plurality of subsets.

13. The apparatus of claim 12 wherein said means for filtering is an auto-regressive filter.

14. The apparatus of claim 11 wherein said means for filtering is an auto-regressive filter.

15. The apparatus of claim 14 wherein said auto-regressive filter is a one-pole filter.

16. The apparatus of claim 11, wherein said filter parameter is determined by:

$$a(k) = \beta e^{j \cdot \frac{\angle r}{m}}$$

where β is a forgetting factor and m is an interval of correlation.

* * * * *